United States Patent
Radetzki et al.

(10) Patent No.: US 11,376,750 B2
(45) Date of Patent: Jul. 5, 2022

(54) MODULAR TRANSPORT ROBOT AND TRANSPORT ROBOT SYSTEM

(71) Applicants: Uwe Radetzki, Bonn (DE); Boris Trendafilov, Sankt Augustin (DE); Dong Uck Kong, Bonn (DE); Sandra Drees, Königswinter (DE); Heike Bischoff, Cologne (DE)

(72) Inventors: Uwe Radetzki, Bonn (DE); Boris Trendafilov, Sankt Augustin (DE); Dong Uck Kong, Bonn (DE); Sandra Drees, Königswinter (DE); Heike Bischoff, Cologne (DE)

(73) Assignee: Deutsche Post AG, Bonn (DE)

( * ) Notice: Subject to any disclaimer, the term of this patent is extended or adjusted under 35 U.S.C. 154(b) by 47 days.

(21) Appl. No.: 16/261,032

(22) Filed: Jan. 29, 2019

(65) Prior Publication Data
US 2019/0232504 A1 Aug. 1, 2019

(30) Foreign Application Priority Data
Jan. 31, 2018 (DE) ...................... 10 2018 102 127.5

(51) Int. Cl.
*B25J 19/00* (2006.01)
*B25J 5/00* (2006.01)
(Continued)

(52) U.S. Cl.
CPC ............. *B25J 19/007* (2013.01); *B25J 5/007* (2013.01); *B25J 11/008* (2013.01); *B25J 19/005* (2013.01);
(Continued)

(58) Field of Classification Search
CPC .. B25J 19/007; B25J 19/0029; B25J 19/0025; B25J 19/005; B25J 5/007; B25J 11/008; (Continued)

(56) References Cited

U.S. PATENT DOCUMENTS 5,596,319 A * 1/1997 Spry .................... G05D 1/0276
180/68.1
9,387,928 B1 7/2016 Gentry et al.
(Continued)

FOREIGN PATENT DOCUMENTS

DE 20 2016 004 708 U1 12/2016
DE 10 2016 014 882 A1 6/2017
(Continued)

*Primary Examiner* — John D Walters
(74) *Attorney, Agent, or Firm* — Reinhart Boerner Van Deuren P.C.

(57) ABSTRACT

Presented are embodiments of a modular transport robot for transporting consignments. The transport robot includes at least one base element for the structure of the transport robot, at least two expansion modules for the technical equipping of the transport robot, at least one consignment box for receiving consignments, and at least one control device. The base element and each of the expansion modules have corresponding connecting elements and are electrically connected to one another by an electrical connection. The base element has at least one wiring harness for electrically connecting the connecting elements of the base element to one another, and the base element and the expansion modules are designed correspondingly to one another such that the connecting elements of the expansion modules are selectively connectable directly to at least two connecting elements provided at different points, so as to form one common connection to the base element.

37 Claims, 7 Drawing Sheets

(51) Int. Cl.
*B25J 11/00* (2006.01)
*B60L 53/80* (2019.01)
*G06Q 10/08* (2012.01)
*B60F 5/02* (2006.01)
*B62D 63/02* (2006.01)

(52) U.S. Cl.
CPC ............. *B25J 19/0029* (2013.01); *B60F 5/02* (2013.01); *B60L 53/80* (2019.02); *B62D 63/025* (2013.01); *G06Q 10/083* (2013.01)

(58) Field of Classification Search
CPC ... B60L 53/80; B60K 1/04; B60S 5/06; B60F 5/02; B62D 63/025; B62D 63/04; G06Q 10/083
USPC ......................................................... 180/65.1
See application file for complete search history.

(56) References Cited

U.S. PATENT DOCUMENTS

| | | | |
|---|---|---|---|
| 9,802,661 B1* | 10/2017 | Kentley-Klay | ...... G05D 1/0088 |
| 10,086,891 B2* | 10/2018 | Hung | ...................... B60L 50/60 |
| 10,369,941 B2* | 8/2019 | Adachi | ............... B60R 16/0215 |
| 10,737,737 B2* | 8/2020 | Birnschein | ................ B60K 1/00 |
| 2013/0175829 A1 | 7/2013 | Kim et al. | |
| 2015/0234398 A1* | 8/2015 | Harris | ......................... B25J 5/00 |
| | | | 700/250 |
| 2017/0123422 A1 | 5/2017 | Kentley et al. | |
| 2017/0146995 A1* | 5/2017 | Stamatovski | ........... G07C 5/008 |
| 2017/0203801 A1 | 7/2017 | Hung et al. | |
| 2018/0126871 A1* | 5/2018 | Martinotti | ............... B60L 13/10 |

FOREIGN PATENT DOCUMENTS

| | | |
|---|---|---|
| EP | 1 440 832 A1 | 7/2004 |
| EP | 3 310 615 B1 | 9/2018 |
| FR | 3 035 870 A1 | 11/2016 |
| JP | H06-016082 A | 1/1994 |
| KR | 100796993 B1 | 1/2008 |
| KR | 101622365 B1 | 5/2016 |
| WO | WO 2017/079289 A1 | 5/2017 |

* cited by examiner

MODULAR TRANSPORT ROBOT AND TRANSPORT ROBOT SYSTEM

CROSS-REFERENCE TO RELATED PATENT APPLICATION

This patent application claims priority to German Application No. 10 2018 102 127.5, filed Jan. 31, 2018, the entire teachings and disclosure of which are incorporated herein by reference thereto.

FIELD

The invention relates to a modular transport robot for transporting consignments. The invention also relates to a transport robot system for the modular assembly of such modular transport robots.

BACKGROUND

Transport robots have already been described which serve for transporting consignments in public areas. In particular, these transport robots serve for the autonomous delivery or targeted delivery of consignments to receiving persons or into receiving facilities from which a receiving person can then withdraw the consignments at a later point in time. These transport robots are basically assembled from different individual components, wherein individual components can be replaced with other components in the event of a defect or the like. These components which are to be exchanged for one another are then typically of identical design, such that components can be exchanged for identical other components. It is basically also possible for particular components to be replaced with different components. This however necessitates a cumbersome adaptation of the other components of the corresponding transport robot. This is however firstly cumbersome and requires a not inconsiderable length of time, for which reason this exchange of components is laborious and expensive.

The known transport robots are therefore designed so as to be suitable for a variety of demands, which self-evidently necessitates corresponding compromises. To be able to keep these comprises within acceptable limits, special transport robots are in turn developed in each case for fundamentally different usage situations.

SUMMARY OF SOME EXEMPLARY EMBODIMENTS OF THE INVENTION

The present invention is based on the object of designing and further developing the modular transport robot and the transport robot system of the type mentioned in the introduction and described in more detail above such that the very widely varied demands on transport robots can be allowed for in an inexpensive manner.

Said object is achieved according to the present disclosure by means of a modular transport robot for transporting consignments, having at least one base element for the physical structure of the transport robot, having at least two expansion modules for the technical equipping of the transport robot, having at least one consignment box for receiving consignments, and having at least one control device for controlling the transport robot, wherein the at least one base element and each of the expansion modules have corresponding connecting elements and are in each case electrically connected to one another by means of at least one electrical connection comprising the corresponding connecting elements, wherein the at least one base element has at least one wiring harness for electrically connecting the connecting elements of the base element to one another, wherein the at least one base element and the expansion modules are designed correspondingly to one another such that the connecting elements of the at least two expansion modules are in each case selectively connectable directly to at least two connecting elements provided at different points, so as to form in each case one common connection to the at least one base element.

Furthermore, said object is achieved according to the present disclosure by means of a transport robot system for the modular assembly of modular transport robots for transporting consignments, having base elements for the physical structure of the transport robots, having various expansion modules for the technical equipping of the transport robot, and having control devices for controlling the transport robots, wherein the base elements and the expansion modules have corresponding connecting elements for electrically connecting the base elements in each case to a multiplicity of expansion modules, wherein the base elements each have at least one wiring harness for electrically connecting the connecting elements of the base element to one another, and wherein the base elements and the expansion modules are designed correspondingly to one another such that, selectively at one point of the base elements, identical and/or different expansion modules are electrically connectable to the base elements by means of connections and/or such that identical and/or different expansion modules at different points of the base elements are selectively electrically connectable to the base elements by means of connections.

According to the invention, it has therefore been identified that, by means of a logical modular construction as described, it is possible for a transport robot to be assembled in a very quick and uncomplicated manner and to be adapted to changing demands as required. To achieve this, in each case those components which are required for assembling the respectively particularly preferred transport robot are taken from a transport robot system in the form of a modular kit. Since the individual components may be different, each component can be selected in accordance with particular criteria.

The transport robots comprise at least one base element for the physical structure of the transport robot. The base element may thus form a type of frame or at least a part of a frame for the structure of the transport robot in order to enable further components to be added, wherein the at least one base element may already have some essential components which then do not need to be separately added. This simplifies the structure of the transport robot but at the same time somewhat restricts the flexibility in constructing the robot. In the case of essential components, this supposed disadvantage can however be accepted. Such a component may for example be a control device for controlling the transport robot, which said transport robot fundamentally requires in numerous applications. Furthermore, the control device may be adapted by means of corresponding software without the control device itself imperatively having to be exchanged.

To expand the base element with functional elements, at least two expansion modules are provided. As required, it is however also possible for more than three expansion modules to be provided. Each expansion module serves here for the technical equipping of the transport robot. For transporting the at least one consignment, a consignment box is used which is suitable for receiving the respective type of consignments. The consignment box may therefore likewise be exchanged as required if the size or type of consignment box does not conform to the at least one consignment to be transported.

The at least two expansion modules are provided for being electrically connected to the associated base element, such that the at least one base element and each of the expansion modules have corresponding connecting elements and are accordingly in each case electrically connected to one another by means of at least one electrical connection which is formed from the corresponding connecting elements. Since one base element is provided for connecting multiple expansion modules and furthermore comprises at least one control device, at least one wiring harness is also provided, which connects the individual expansion modules to one another and/or connects expansion modules to the control device. For this purpose, the wiring harness ultimately electrically connects the connecting elements of the base elements to one another.

Quick and uncomplicated assembly of the transport robot can furthermore be achieved by virtue of the at least one base element and the expansion modules being designed correspondingly to one another such that each of the expansion modules can be connected by means of electrical connections to the base element at different points of the base element. For this purpose, the connecting elements of the expansion modules can be selectively connected to different connecting elements without the need to make modifications to the base element or to the expansion modules. The connecting elements of the at least two expansion modules are each selectively directly connectable to at least two connecting elements provided at different points, so as to form in each case one common connection to the at least one base element.

Aside from the components of a single modular transport robot, the transport robot system comprises yet further components from which particular components can then be selected in each case in order to then modularly assemble a transport robot. Here, the different types of components may always be of identical design to one another. It is however particularly preferable if at least particular types of components are provided in different configurations in order for the respectively most suitable component to be selected therefrom. Here, base elements are provided for the physical structure of the transport robots, and different types of expansion modules are provided for the technical equipping of the transport robot. As described, the base elements and the expansion modules have corresponding connecting elements for electrically connecting the base elements in each case to a multiplicity of expansion modules, wherein the base elements may each have at least one wiring harness for electrically connecting the connecting elements of the base element to one another.

Furthermore, control devices for controlling the transport robots are provided, which control devices may be already connected to, or still to be connected to, the base elements. Furthermore, the base elements and the expansion modules are designed correspondingly to one another such that, selectively at one point of the base elements, identical and/or different expansion modules can be electrically connected to the base elements by means of connections. Alternatively or in addition, it is however also possible for identical and/or different expansion modules to be selectively electrically connected to the base elements at different points of the base elements by means of connections. In this way, a high level of flexibility and exchangeability in the assembly of the transport robots is achieved.

In the present case, consignments are basically to be understood to mean different articles which can preferably be transported with reasonable effort. In particular, the consignments may be in the form of piece goods. These may involve articles relating to daily requirements, such as consumable materials or foodstuffs, as well as technical articles and equipment. In many cases, the consignments are consignments of courier services, transport companies, warehousing companies or postal companies. The latter may also be referred to as postal consignments. As required, the consignments are letter consignments, package consignments and/or flyers. Here, package consignments also encompass packets, whereas flyers may also be catalogues, brochures and magazines. Furthermore, a letter consignment may be not only a letter but also a postcard. Package consignments and other consignments are in many cases packaged items, wherein the consignment then encompasses the packaging and the item packaged therein.

Since the transport robots serve for transporting consignments, even if the consignments may take a wide variety of forms and could therefore be referred to very generally also as piece goods, package consignments or the like, the transport robots could also be referred to as consignment robots. The expression "consignment robots" would give the impression here that the robots transport consignments in particular. By contrast, the expression "transport robot" in particular gives the impression that the robot serves for transport, which is equally correct. Consequently, the expressions "transport robot" and "consignment robot" would in the present case also be interchangeable as required, or could be understood as being synonymous. It then follows analogously from this that the transport robot system could basically likewise be referred to as consignment robot system. For the sake of simplicity and in order to avoid unnecessary repetitions, the expressions "transport robot" and "transport robot system" will be used below, despite the circumstances described above.

Furthermore, for better comprehensibility and in order to avoid unnecessary repetitions, the modular transport robot and the transport robot system will be described jointly, without a specific distinction being made in each case between the modular transport robot and the transport robot system. It is however clear to a person skilled in the art from the context which feature in each case of the modular transport robot and/or of the transport robot system is particularly preferred.

In a first particularly preferred embodiment of the modular transport robot, the connecting elements are designed at least substantially as plug-type connecting elements and/or the electrical connection is designed at least substantially as an electrical plug-type connection. The plug-type connecting elements can consequently be plugged into one another for connecting purposes, and/or pulled apart again for separating purposes, in a quick and straightforward manner. The modular transport robot can consequently be easily assembled and also easily retroactively modified again. With regard to the electrical connection, an electrical plug-type connection is preferred for the same reasons. To form a plug-type connection, the connecting elements may comprise socket elements and plug elements, which are preferably designed so as to correspond to one another. This simplifies the assembly of the transport robot. It may be preferable here if the connections can be made exclusively by virtue of corresponding connecting elements being plugged one into the other. This is however not imperative. Provision may for example be made for the corresponding connecting elements to initially be plugged one into the other and subsequently additionally mechanically secured or locked. In other words, an embodiment at least substantially as a plug-type connecting element and/or plug-type connection is basically adequate.

Alternatively or in addition to the electrical plug-type connections or plug-type connecting elements which are distinguished by a form fit at least in one direction, in particular at least in two mutually perpendicular directions, and/or permit quick and intuitive positioning, centering and/or alignment of the modules, use may also be made of other joining methods. These may be force-fitting or cohesive joining methods, which are however preferably releasable again, specifically furthermore preferably without disproportionately great effort. For example, joining by means of a magnetic field force, inductive connection, and/or connection via radio, wherein this can basically be understood to mean any wireless connection between transmitter and receiver, may be used.

At least one communication device for communication between the transport robot and an external control station is provided. The communication may however also take place between multiple transport robots, specifically in particular between the transport robots of a fleet of transport robots, such that these can coordinate with one another with regard to their further course of action. It may basically be particularly expedient if the communication takes place for example via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE). Other ways of communication are known and may basically also be utilized. Furthermore, communication is preferably to be understood to mean an exchange of information in both directions, which is encompassed in the selected expression but is not imperatively necessary. For example, the transport robot may transmit information regarding the location and/or status of the transport robot by means of the communication device. This may relate to the state of charge, the next delivery location to be traveled to, a battery state, a malfunction or the like. The transport robot may however also receive pieces of information, which may include a specified location for delivering and/or picking up a consignment, to which the transport robot then immediately travels to at a suitable time. It may also be desirable for the transport robot to emit an alarm if it has become stuck, has been damaged, is immobilized and/or has been stolen. Furthermore, in the case of a fleet of transport robots, the positions and movements of the fleet can be monitored and evaluated if the transport robots transmit pieces of location information at regular intervals, such that the delivery and/or retrieval of a large number of individual consignments can be carried out more efficiently.

Alternatively or in addition, at least one drive device for moving the transport robot to a picking-up location and/or delivery location for the consignments may be provided. The transport robot can thus deliver and/or pick up consignments. Here, the transport robot may drive, fly or sail from location to location. The transport robot may basically also combine driving, flying and/or sailing. If at least one signal router is provided, this can transmit particular pieces of information from particular expansion modules to other expansion modules. In this way, the transport robot can be controlled or the like without the control device itself having to be involved. The transmission of signals by means of the at least one signal router may be non-specific or may relate in each case to only particular types of signals. In the latter case, a different signal router may then be provided for different types of signals.

For handling reasons, and from a construction aspect, it is preferable if the at least one base element has a multiplicity of mutually spaced-apart receptacles for receiving expansion modules, in particular in positively locking fashion. Then, the expansion modules can for example be easily slid into the receptacles of the base element, where said expansion modules can then be secured against inadvertently falling out. The modularity concept is allowed for by virtue of the at least two expansion modules being received, in particular in positively locking fashion, in different receptacles. Here, receptacles and expansion modules may preferably be combined with one another in a variety of ways.

If the receptacles have an opening for inserting the expansion modules, secure and reliable connection of expansion modules and base elements can be achieved. This is the case in particular if at least one connecting element, in particular plug-type connecting element, is provided at those sides of the receptacles which are averted from the openings. The corresponding plug-type connection can then be preferably positively closed when an expansion module is slid into a receptacle. Connections are however also conceivable which are closed without a plugging-together action, and preferably nevertheless releasable again.

For modularity and flexibility, the receptacles are preferably of identical design, in particular of identical size. To then however allow for the fact that individual expansion modules are larger, owing to the components installed therein, than the receptacles, it is possible for at least one expansion module to be received simultaneously in two adjacent receptacles of the at least one base element. In order that the partition between two receptacles then does not impede the connection, the at least one expansion module may receive a wall, which separates the two adjacent receptacles, at least partially, in a recess of the expansion module. In addition or alternatively, it may be expedient to utilize the connecting elements of the two receptacles for the attachment of the corresponding expansion module. This may then be connected to in each case one connecting element, assigned to each receptacle, so as to form a corresponding connection. Here, for the sake of simple connectability and/or releasability, it is expedient if the connecting element is a plug-type connecting element, or the connection is a plug-type connection.

The electrical connection may also contribute to mechanical locking of the expansion modules on the base element, specifically in particular if the electrical connection is an electrical plug-type connection. A force-fitting and/or cohesive connection would however alternatively or additionally also be conceivable. If this mechanical locking is not sufficient, or it is intended for the electrical connections to be relieved of load, it is possible for the at least one base element to be, as required, additionally mechanically connected to the at least two expansion modules preferably in each case by means of at least one detent connection or one magnetic connection. These mechanical connections may preferably be provided at those sides of the receptacles which are averted from the openings. The mechanical connections can then be made in a very simple and reliable manner.

It is basically not necessary for the control device, the communication device, the drive device and/or the signal router to be assigned to in each case one separate expansion module, although this would be conceivable. The devices may also, as required, be part of the base element, if this is expedient. The devices may however also be received together with further functional devices in a common expansion module, if this is expedient. To however increase modularity, the at least one control device may be provided in an expansion module in the form of a control module, the at least one communication device may be provided in an expansion module in the form of a communication module, and/or the at least one drive device may be provided in an expansion module in the form of a drive module.

Alternatively or in addition, the modularity and flexibility of the transport robot may be allowed for by virtue of at least one expansion module being designed as a consignment box for transporting consignments, as a drive module for moving the transport robot to a picking-up location and/or delivery location for the consignments, as an axle module for the mounting of a wheel, as a communication module for communication between the transport robot and an external control station, as a control module for controlling the transport robot, as a battery module for the voltage supply of the transport robot, as a lighting module for the lighting of the transport robot and/or of the surroundings of the transport robot, as a sensor module for detecting the surroundings of the transport robot, and/or as a solar module for supplying the transport robot with electrical current obtained by means of at least one solar panel. It is thus possible in a simple manner for the various functionalities discussed to be provided in a highly flexible manner independently of one another by means of separate expansion modules.

In order that the base element can be used in as versatile a manner as possible, the at least one wiring harness may have, preferably particular, lines for the supply of voltage to at least one expansion module, lines for transmitting control commands and/or pieces of information between expansion modules and/or between at least one expansion module and the at least one control device and/or communication device. By means of a separation of lines for the voltage supply, pieces of information and control commands, undesired interactions between the individual transmissions can be avoided. This is the case in particular because, depending on the respective assembly configuration of the transport robot, there may be very different resulting line paths and transmission requirements, which cannot be thought out in advance, or can be thought in advance only to a limited extent, with regard to possible faults.

So as not to be restricted, or so as to be less restricted, with regard to the expansion modules used, it is possible for at least two, in particular identical, base elements to be used, which are provided, preferably on a top side and/or on a bottom side, with corresponding base connecting elements. The corresponding base connecting elements permit simple connection. In the case of base plug-type connecting elements, simple plugging of the base elements onto one another, so as to form a base connection, in particular base plug-type connection, is made possible as required. With regard to the structure of the transport robot, it is preferred from a construction aspect if at least two base elements, preferably one above the other, are connected to one another by means of a base connection formed by means of the corresponding base connecting elements.

Here, the at least two base elements may also, aside from the base connection, be additionally mechanically connected to one another preferably by means of detent connections or magnetic connections, in particular if the base plug-type connection is an at least predominantly form-fitting base plug-type connection. An inadvertent separation of the base elements can thus be avoided. Furthermore, the electrical base connections between the base elements can be mechanically relieved of load. It is then expedient from a construction aspect if, for example, the mechanical connections are provided at those edges of the base elements which face toward one another.

For a simple and flexible connection of the consignment box to further elements of the transport robot, it is expedient if the at least one consignment box has, preferably on a top side and/or on a bottom side, at least one base connecting element for connecting to a base element and/or to a further consignment box. It is then possible, as required, for the consignment box to be connected both to a further consignment box and to a base element. If the at least one consignment box furthermore has, on a top side and/or on a bottom side, base connecting elements which correspond to one another and/or to the base connecting elements of at least one base element, the consignment box can, on the top side and the bottom side, be easily connected to further consignment boxes and/or base elements. Here, from a construction aspect, and with regard to the joining process, it is particularly simple and expedient if the base connecting elements are designed as base plug-type connecting elements, or the base connections are designed as base plug-type connections.

It is furthermore possible, as required, for at least one solar panel to be provided, such that not all of the energy required has to be carried on board in the form of batteries. In the present case, a solar panel is also to be understood to mean one which for example has a solar foil or is formed at least substantially from a solar foil. At least a part of the required electrical energy can be obtained on the move by means of at least one solar panel. The solar panel may then have, preferably on a bottom side, at least one base connecting element for connecting to a base element and/or to a further consignment box. This permits a flexible connection in particular to the top side of the transport robot, depending on the structure thereof. Here, it is then possible for the base connecting element of the at least one solar panel to be designed so as to correspond with at least one base connecting element of at least one base element and/or of a consignment box. A high level of exchangeability and thus flexibility is thus generated in this case too. Here, it is also particularly simple and expedient in terms of construction and function if the base connecting elements are designed as base plug-type connecting elements or the base connections are designed as base plug-type connections.

For the structure of the transport robot, a layered construction with multiple planes is particularly expedient. It may consequently be expedient for the at least one base element, the at least one consignment box and/or the at least one solar panel to be arranged in multiple planes one above the other, and for the at least one base element, the at least one consignment box and the at least one solar panel to be preferably connected to one another directly, in particular by means of a detent connection.

For efficient operation and in order to increase the radius of action of the transport robot, it may alternatively or additionally be expedient for the transport robot to have at least one electromotive brake. This may then be utilized for converting braking energy into electrical energy and, as required, for storing the electrical energy thus obtained in a battery, for which purpose the electromotive brake is then preferably connected to the corresponding battery and/or to a battery module. The conversion of the braking energy can be performed easily and reliably if the electromotive brake has an eddy-current brake.

For reliable and damage-free transport of the consignments, it is basically expedient if the at least one consignment box has at least one opening, which is preferably closable by means of a flap and/or door, for inserting and removing at least one consignment. It is thus possible for the consignment to be protected as required not only against environmental influences but also against theft. The latter is the case in particular if a locking means, in particular lock for locking the flap and/or door in a position which closes the opening is provided. If the locking means is adjusted by means of the control device from an opened position into a closed position, no operator is required for this purpose, and the opening of the locking means or of the consignment box cannot be readily manipulated.

In a first particularly preferred embodiment of the transport robot system, communication devices for communication between transport robots and external control stations, drive devices for moving the transport robots to a picking-up location and/or delivery location for the consignments, and/or signal routers for transmitting signals, in particular at least a particular type of signals, between expansion modules are provided. It is thus possible for the corresponding functionalities to be provided, selectively if required. These may each be identical functional devices, such that they are either always provided or are provided only selectively. The functional devices of one type may however also each be of different design. This creates the possibility of selecting, from several functional devices of one type, that functional device which is best suited to the respective usage situation.

High flexibility and exchangeability can also be achieved if the base elements each have a multiplicity of mutually spaced-apart receptacles for receiving identical and/or different expansion modules, in particular in positively locking fashion. Then, either identical and/or different expansion modules of a particular type are provided, from which a selection can then be made in order to assemble or construct at least one transport robot, without this having to have an influence on the receptacles or on the form of the expansion modules. It can consequently be achieved that at least two identical and/or different expansion modules can be received, in particular in positively locking fashion, in different receptacles. Alternatively or in addition, for the sake of simplicity, it can be achieved that the receptacles of the base elements each have an opening for inserting the expansion modules and have at least one connecting element at those sides of the receptacles which are averted from the openings. This simplifies not only the mechanical connection of the expansion modules but also at least the electrical connection of the expansion modules to the respective base element. Here, it is particularly simple and expedient, as already described, if the connecting elements or the in particular electrical connections are designed as plug-type connecting elements or plug-type connections.

In order to be able to install even relatively large expansion modules without having to adapt the partitioning of the base elements, it is possible for an expansion module to be received simultaneously in two adjacent receptacles of the base elements. Here, it is expedient if the expansion modules are provided for being connected simultaneously to connecting elements of the two adjacent receptacles, so as to form a connection. Alternatively or in addition, a wall which separates the two adjacent receptacles can be at least partially received in a recess of the expansion modules, if these are installed correspondingly. Here, too, for the sake of simplicity and functionality, it is preferred if the connecting elements or the in particular electrical connections are designed as plug-type connecting elements or plug-type connections.

The base elements may, in addition to an electrical connection, in particular an at least partially form-fitting plug-type connection, also be mechanically connectable to expansion modules preferably by means of detent connections or magnetic connections, and/or cohesively. An inadvertent release can thus be counteracted. Furthermore, the mechanical connections may be provided at those sides of the receptacles which are averted from the openings. The mechanical connections can thus be made easily. Alternatively or in addition, joining by means of magnetic field force, inductive connection and/or connection via radio, wherein this can basically be understood to mean any wireless connection between transmitter and receiver, are also conceivable.

If the control devices are provided in expansion modules in the form of control modules, the communication devices are provided in expansion modules in the form of communication modules, and/or the drive devices are provided in expansion modules in the form of drive modules, these functional devices can be easily installed and exchanged, specifically both for identical or for different functional devices.

Furthermore, it is basically possible for expansion modules to be provided which are designed for example as identical and/or different consignment boxes for transporting consignments, as identical and/or different drive modules for moving the transport robot to a picking-up location and/or delivery location for the consignments, as identical and/or different axle modules for the mounting of a wheel, as identical and/or different communication modules for communication between the transport robot and an external control station, as identical and/or different control modules for controlling the transport robot, as battery modules for the voltage supply of the transport robot, as identical and/or different lighting modules for the lighting of the transport robot and/or of the surroundings of the transport robot, as identical and/or different sensor modules for detecting the surroundings of the transport robot, and/or as identical and/or different solar modules for supplying the transport robot with electrical current obtained by means of at least one solar panel. In particular if the modules of one type differ in terms of function, it is always possible for specialized and highly suitable transport robots to be assembled for different applications.

To provide high functionality and flexibility, it is possible for the wiring harnesses of the identical and/or different base elements to have, preferably particular, lines for the supply of voltage to at least one expansion module, lines for transmitting control commands and/or pieces of information. Here, the control commands and/or pieces of information may be transmitted via the corresponding wiring harnesses between expansion modules and/or between at least one expansion module and the at least one control device and/or communication device.

Identical and/or different base elements may each be provided, preferably on a top side and/or on a bottom side, with corresponding base connecting elements, for the sake of simplicity in particular base plug-type connecting elements, in order to simplify a connection of the base elements to one another and/or to further elements. Here, the base elements, preferably one above the other, may be connected to one another by means of a base connection, in particular base plug-type connection, formed by means of the corresponding base connecting elements. This is simple and furthermore increases flexibility.

If the identical and/or different base elements are, in addition to the base connections, in particular in the form of at least partially form-fitting base plug-type connections, can be mechanically connected to one another preferably by means of detent connections, it is possible for more reliable and more durable transport robots to be formed. Corresponding mechanical connections can be provided in a simple manner in terms of construction if the detent connections are provided at those edges of the base elements which face toward one another. Alternatively or in addition, joining by means of magnetic field force, inductive connection and/or connection via radio, wherein this can basically be understood to mean any wireless connection between transmitter and receiver, are also conceivable.

If identical and/or different consignment boxes are provided, these may for example be selected in accordance with type and/or number in order to form corresponding transport robots. It is preferable here if the consignment boxes have, on a top side and/or on a bottom side, at least one base connecting element for connecting to a base element and/or to a further consignment box. This simplifies the assembly process and increases the flexibility during the assembly of the transport robots. If the at least one consignment box has, on a top side and/or on a bottom side, base connecting elements which correspond to one another and/or to the base connecting elements of the base elements, the assembly process is further simplified and made more flexible. Both apply in particular if the base connecting elements are base plug-type connecting elements, or the base connections are base plug-type connections.

It is likewise possible for identical and/or different solar panels to be provided in order for these to be selected in accordance with demand, number and/or type for the manufacture of transport robots. If a base connecting element, in particular base plug-type connecting element, for connecting to a base element and/or to a further consignment box is then provided on the bottom sides of the solar panels, the assembly process is simplified and made more flexible in a known manner.

The base elements, the consignment boxes and/or the solar panels may be arranged in multiple planes one above the other. It is thus for example possible to realize a layered structure, in which different functional devices are arranged in different planes. In accordance with the corresponding layered structure, it is then also possible for the corresponding arrangement to be varied. Here, the base elements, the consignment boxes and/or the solar panels are then connectable to one another directly, in particular by means of a detent connection, which contributes to simple and flexible assembly of the transport robots.

If the at least one consignment box has at least one opening, which is preferably closable by means of a flap and/or door, for inserting and removing at least one consignment, the consignment can be transported reliably and without being damaged. For this purpose, it is then preferable for locking means, in particular in the form of a lock for locking the flap and/or door in a position which closes the opening, to be provided. Said locking means can then cause or permit the opening of the flap and/or door under certain circumstances, if this is controlled for example by means of a control device of the transport robot.

BRIEF DESCRIPTION OF THE DRAWINGS

The invention will be discussed in more detail below on the basis of a drawing, which illustrates merely an exemplary embodiment. In the drawing.

DETAILED DESCRIPTION

Figure 1:
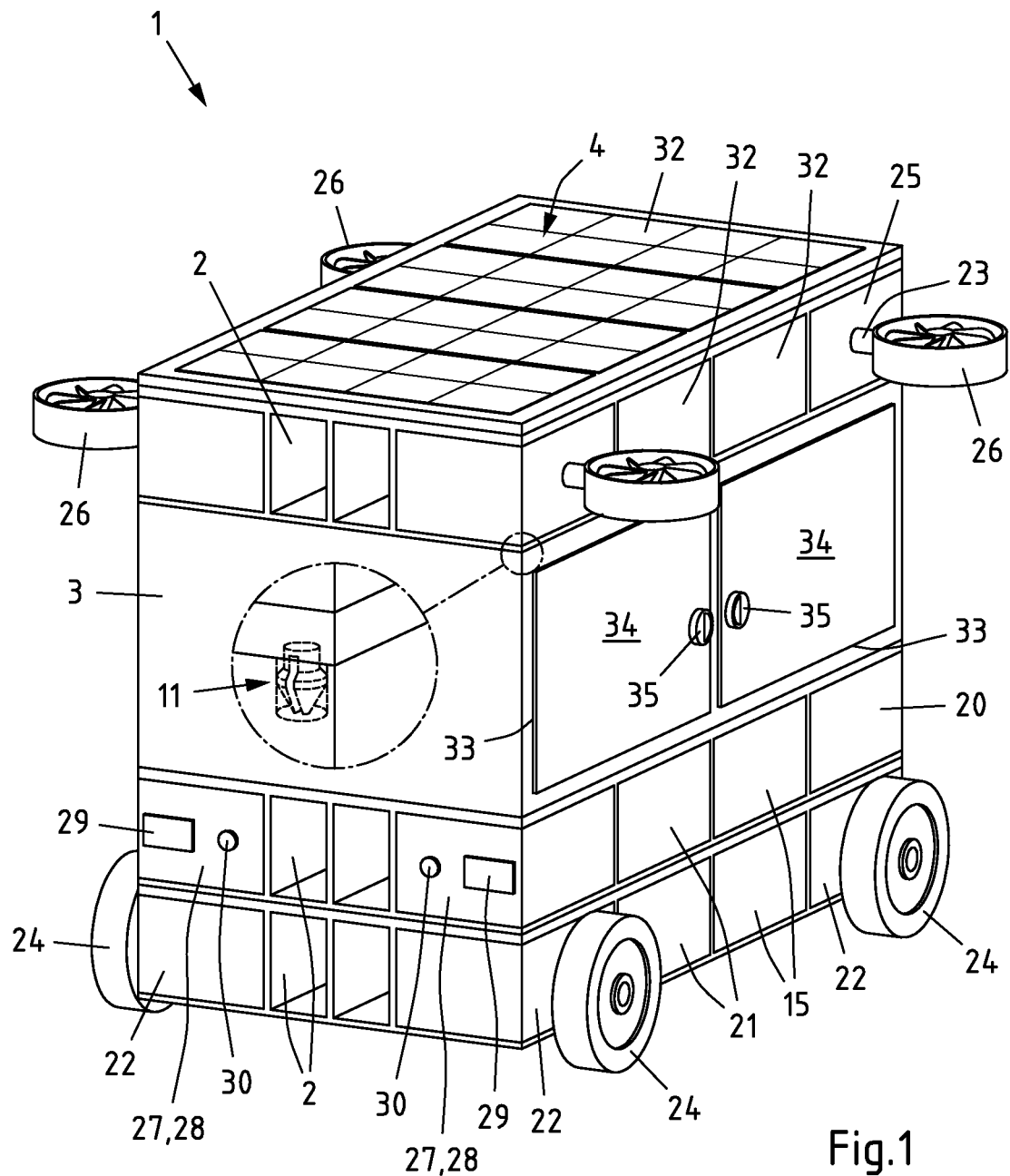
FIG. 1 shows a transport robot according to the invention, assembled from a transport robot system according to the invention, in a perspective view.
Figure 2:
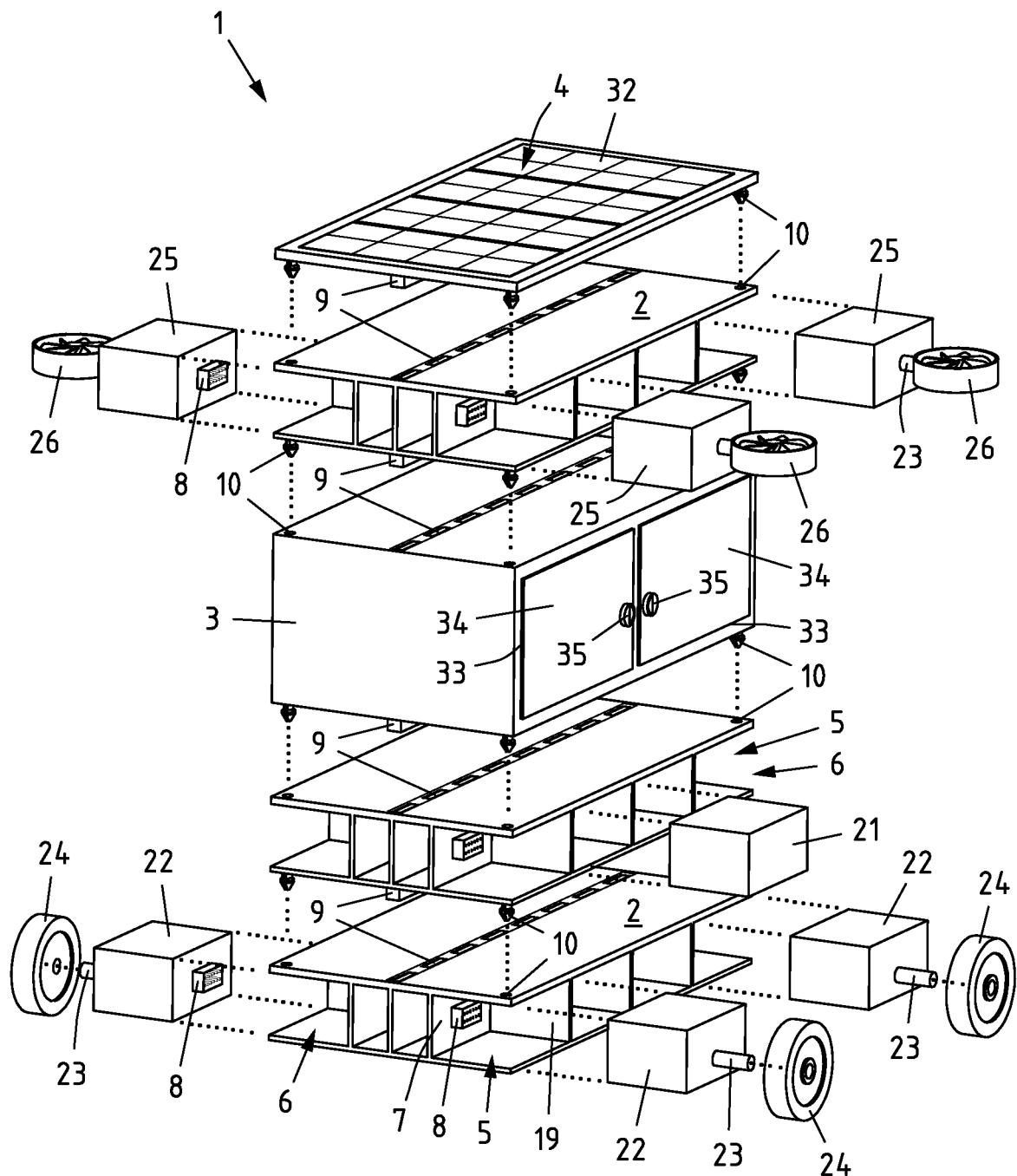
FIG. 2 shows the transport robot from FIG. 1 in an exploded illustration.

FIG. 1 illustrates a transport robot 1 of modular construction which has been assembled from components of a transport robot system. In the case of the illustrated and thus preferred transport robot 1, three base elements 2 are provided, which are of identical construction and are arranged one above the other. Here, between the uppermost base element 2 and the lower two base elements 2, there is provided a consignment box 3 in which the consignments can be accommodated for transport, be it for the delivery or retrieval of consignments. On the upper base element 2 there is furthermore mounted a solar panel 4 for the purposes of generating electrical current for the transport robot 1. The assembly and the individual components of the transport robot 1 are more clearly illustrated in the exploded illustration of FIG. 2. For the sake of better clarity, however, some of the expansion modules illustrated in FIG. 1 have been omitted in FIG. 2.

Figure 3A:
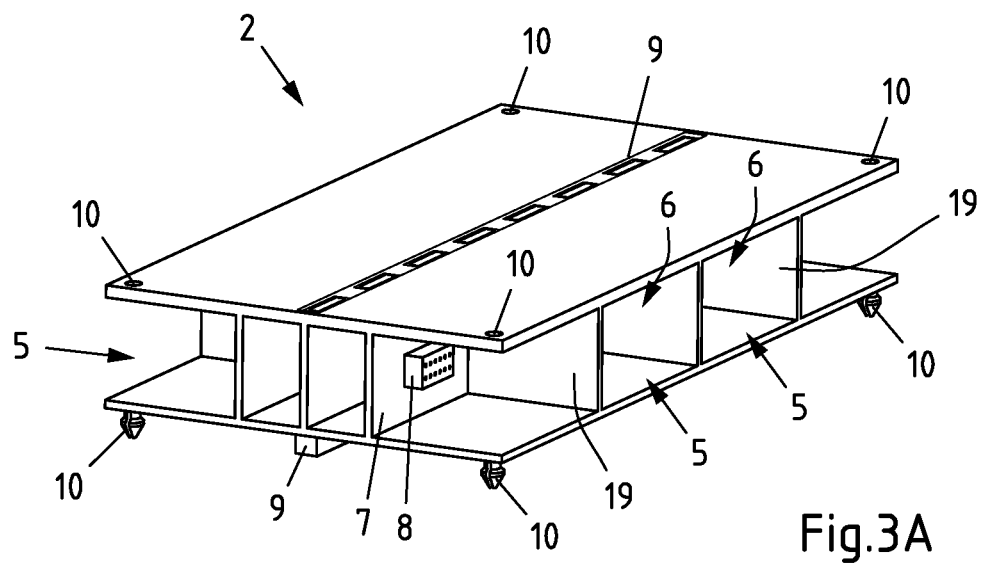
FIGS. 3A-B show a base element of the transport robot from FIG. 1 in a perspective view and in a section along a plane parallel to the base element.

The base elements 2 illustrated by way of example in detail in FIG. 3A are visibly of identical construction, although this would not be imperatively necessary, and have a top side and a bottom side, between which there are provided lateral receptacles 5. The receptacles 5 each have a lateral opening 6 and, on an inner rear wall 7, in each case one electrical connecting element 8 in the form of an electrical plug-type connecting element. It would basically also be possible for in each case multiple connecting elements 8 to be provided, which has however not been shown in the present case for the sake of simplicity. The connecting elements 8 are however designed such that it is basically possible for a multiplicity of individual connections for a voltage supply, a transmission of pieces of information and/or control commands to be realized without the need for respectively separate connecting elements 8 or connections for this purpose.

Furthermore, on the top side and on the bottom side of the base elements 2, there are provided electrical base connecting elements 9 in the form of base plug-type connecting elements, which are designed correspondingly to one another. Here, the upper base connecting element 9 is designed in each case as a socket, and the lower base connecting element 9 is designed in each case as a plug. This is however not imperative. By means of the base connecting elements 9, it is possible during the plugging-together or stacking of the base elements 2 for electrical base connections, in the form of electrical base plug-type connections, to be formed. It is thus possible for the base elements 2 of the transport robot 1 to be electrically connected to one another.

The base elements 2, the consignment box 3 and the solar panel 4 are furthermore also mechanically connected to one another, for which purpose all of these components have corresponding connecting means 10. Said connecting means make it possible, when assembly has been performed correctly, for a detent connection 11 to be effected between the components. Here, the base elements 2 and the consignment box 3 have, at the edge on the top side and on the bottom side, respectively corresponding connecting means 10 which permit stacking of base elements 2 and consignment boxes 3. Only the solar panel 4 has corresponding connecting means 10 only on the bottom side, because the illustrated and thus preferred solar panel 4 is basically mounted on the top side of the transport robot 1. Detent connections 11 can be made quickly. This however also applies, as required, to magnetic connecting means. It is however basically also possible for other mechanical connections to be provided.

Figure 3B:
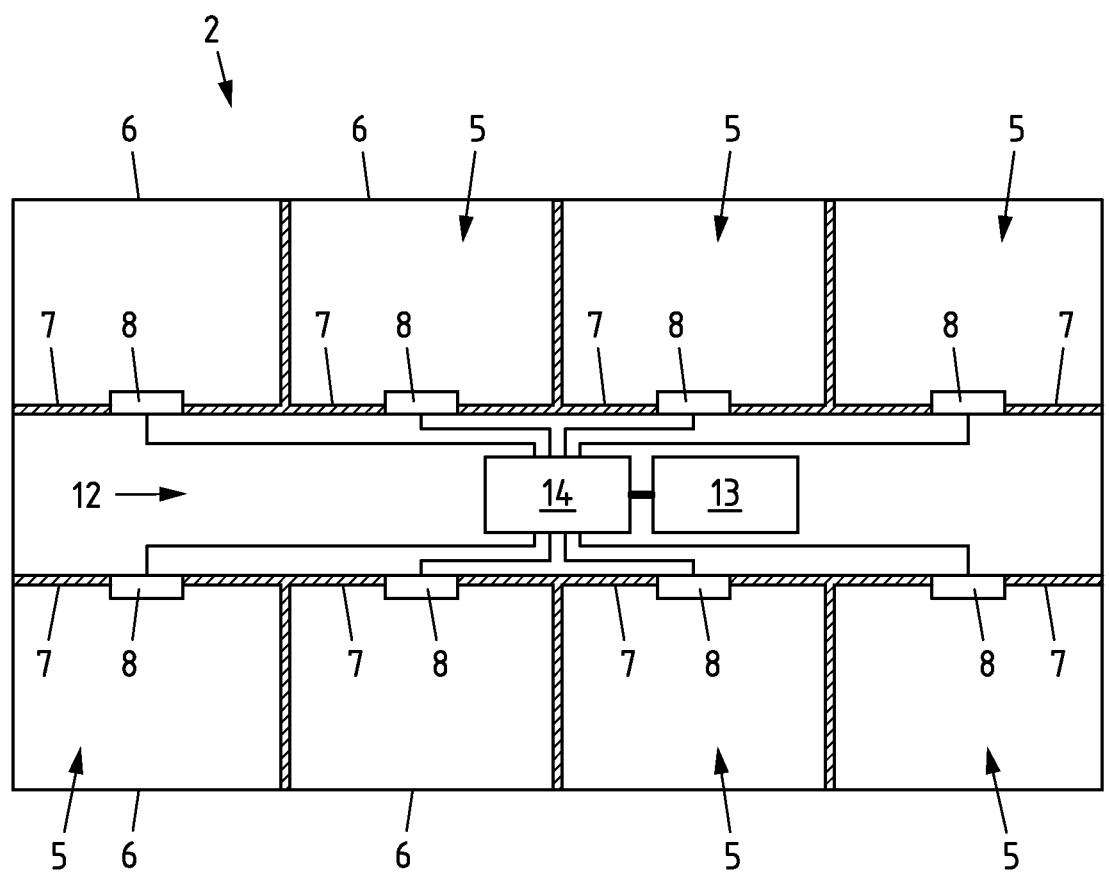

In the case of the illustrated and thus preferred base elements 2, as illustrated by way of example in a sectional view in FIG. 3B, the individual electrical connecting elements 8 are, like the base connecting elements 9, connected to a wiring harness 12 which is arranged in a central region of the base elements 2. Connected to the wiring harness 12 is a control device 13 which serves for controlling the transport robot 1, but which may also be provided at some other point. In particular, the control device 13 may for example be connected in the form of a control module to a base element 2 by means of a connecting element 8 if easy exchange of the control device 13 is desired.

Furthermore, in the case of the illustrated and thus preferred base element 2, a router 14 is provided which serves for transmitting and distributing particular signals. The router 14 may in this case transmit different types of signals, for example from different types of expansion modules to different types of expansion modules, if no processing of the signals in the control device 13 is required. The processing or conversion of the signals, which may in particular be control commands or pieces of information, may also be performed independently in at least one expansion module. Provision may however also be made for different types of signals, originating for example from different expansion modules, to be transmitted via in each case at least one specific router 14. It is thus for example possible for lighting signals and/or sensor signals to always be transmitted by separate routers 14 in order to always ensure reliable signal transmission even in the case of transport robots 1 of very different construction. Also, the one or more routers 14 do not imperatively need to be a fixed constituent part of the base element 2. At least one router 14 may also be accommodated in an expansion module. This may be a separate router module, in the case of which at least one router 14 is integrated into the expansion module, wherein this expansion module may then also have a functional device which is preferably functionally related to the router 14. The router 14 may for example transmit the signals from the functional device and/or to the functional device.

Figure 4:
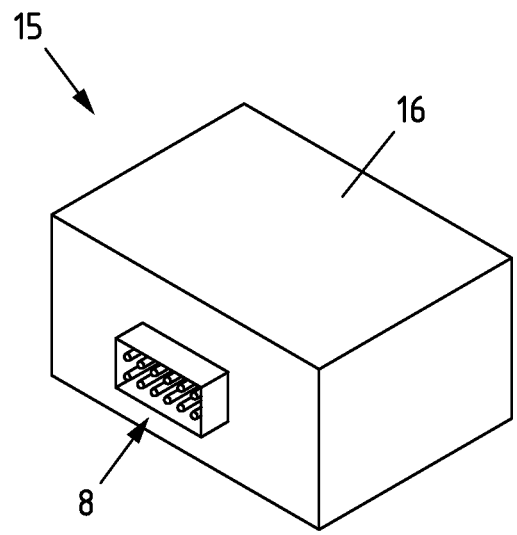
FIG. 4 shows an expansion module of the transport robot from FIG. 1 in a perspective view.

FIG. 4 illustrates, by way of example, an expansion module 15 for connecting to a base element 2. The illustrated and thus preferred expansion module 15 comprises a housing 16, in which a functional device of the transport robot 1 is accommodated. The electrical connection between the functional device and the base element 2 is realized by means of a connecting element 8, which is compatible with the connecting elements 8 of the base elements 2. The expansion modules 15 may in this case basically be connected in any desired sequence, and at any desired points of the base elements 2, to said base elements. For this purpose, the expansion modules 15 are slid laterally via the associated openings 6 into the receptacles 5 of the base elements 2, wherein then the correspondingly designed connecting elements 8 provided on the corresponding sides are situated together so as to form an electrical connection. In this way, a type of plug-and-play connection can be created, such that separate setting-up of the expansion modules 15 by the technician is no longer required.

Figure 5:
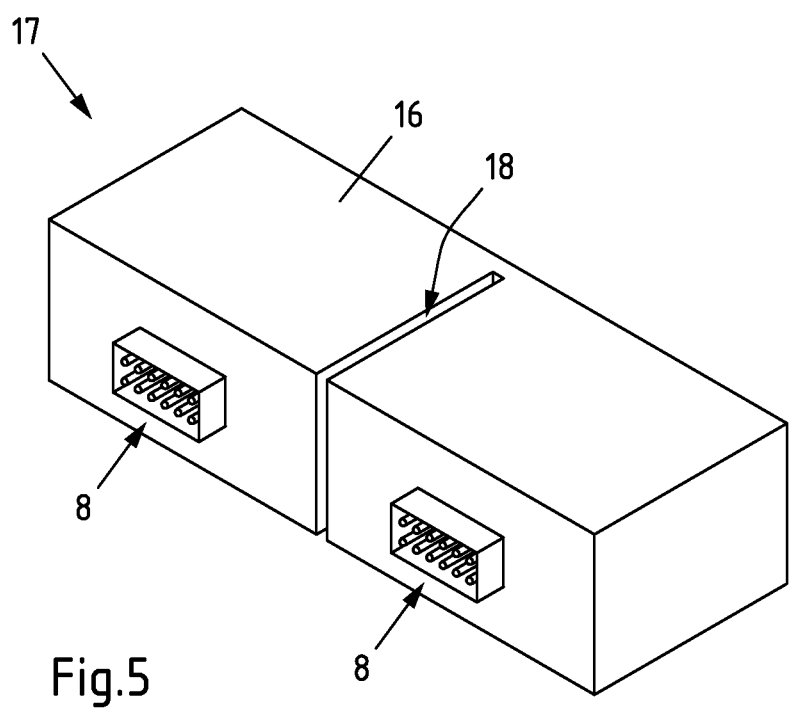
FIG. 5 shows an expansion module of relatively large dimensions of the transport robot from FIG. 1 in a perspective view.

The size of the expansion modules 15 is in this case selected such that the greatest possible number of different functional devices can be accommodated in each case in one expansion module 15. In exceptional cases, it may however be desired to use an expansion module 17 which fills two adjacent receptacles 5 of a base element 2, as illustrated by way of example in FIG. 5. The illustrated expansion module 17 comprises two identical connecting elements 8 for providing two connections, in particular plug-type connections, to the base element 2. This is however not necessary. Furthermore, the expansion module 17 has a recess 18 in which the expansion module 17 can at least partially receive a partition 19 provided between two receptacles 5 of a base element 2, in order to ensure the sliding of the expansion module 17 into the base element 2.

Figure 6:
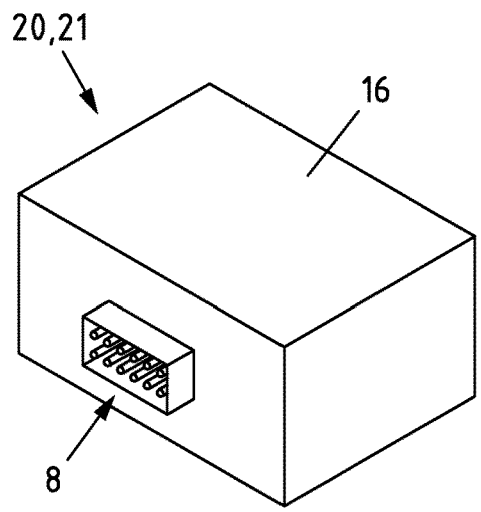
FIG. 6 shows a control module and/or communication module of the transport robot from FIG. 1 in a perspective view.

FIG. 6 illustrates an expansion module in the form of a communication module 20 and/or a control module 21. The communication module 20 or control module 21 requires only one electronic functional device, which can be installed in its entirety in the expansion module. Nevertheless, the communication module 20 or the control module 21 may be equipped with different software in order to be able to adapt the communication module 20 or the control module 21 in a very simple manner to the respective requirements. It is however alternatively also possible for different types of communication modules 20 and control modules 21 to be provided in the transport robot system, which are also adapted in terms of hardware to specific uses and are consequently selected in accordance with the application. Here, the control modules 21 can be adapted with regard to their control devices to particular uses. In the case of a communication module 20, it is also possible for a transmitter and a receiving device to be installed in the communication module, which permit communication through the housing 16 of the communication module 20. The communication may take place between a transport robot 1 and a central control unit and/or between multiple transport robots 1, specifically in particular between the transport robots 1 of a fleet of transport robots 1, such that these can coordinate with one another with regard to their further course of action. The communication may basically take place for example via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE). Other ways of communication are known and may basically also be utilized.

Figure 7:
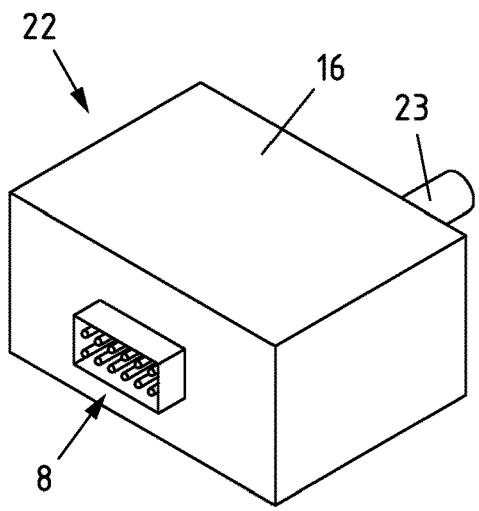
FIG. 7 shows a drive module for the driving of the transport robot from FIG. 1 in a perspective view.
Figure 8:
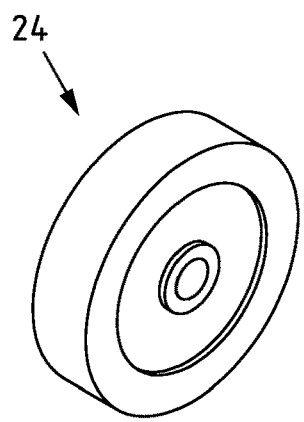
FIG. 8 shows a wheel of the drive module from FIG. 7 in a perspective view.

FIG. 7 illustrates an expansion module in the form of a drive module 22. The drive unit of the drive module 22 is in this case formed in particular by an electric motor. Furthermore, the drive module 22 has a drive output shaft 23, which can transmit drive energy to the outside. The drive output shaft 23 may for example be utilized for the mounting of a wheel 24, if it is the intention for the transport robot 1 to be able to drive autonomously. Depending on the type of drive and the respective demands on the drive, it is possible for different types of drive modules 22 to be provided in the transport robot system. Here, the drive modules 22 may for example differ with regard to the power of the drive and/or with regard to the gearing assigned thereto. If the transport robot only has to cover short distances on flat land, it may suffice to use lower-powered drives than those for relatively great distances on hilly land. Here, it is also possible for the wheels 24 to be adapted to different demands. An exemplary wheel 24 is illustrated in FIG. 8, the tire of which is soft and makes do without a profile. It is however also possible for firmer and/or profiled wheels 24 to be provided in the transport robot system. The mounting may be performed easily by virtue of the wheels 24 being fitted onto the drive output shaft 23 of the drive module 22, which also promotes a simple exchange of the wheels 24. In many cases, it will furthermore be preferable if each wheel 24 is driven by means of a dedicated drive module 22. This is however not necessary and may also be undesirable for cost reasons. Then, instead of a drive module 22, it is also possible for an axle module to be provided as an expansion module, which axle module provides an axle for the mounting of a wheel 24 instead of the drive output shaft 23 of the drive module 22. Consequently, in the case of an axle module, it is also the case that no drive unit is provided or necessary. Under some circumstances, it may however nevertheless be desirable for different types of axle modules to be provided in the transport robot system.

Changes in direction of the transport robot 1 may be caused for example by means of different rotational speeds and/or directions of rotation of the wheels 24. It is however also possible for at least one drive module 22 to be designed as a controllable drive module 22. In this case, it is for example possible for the axle or the drive output shaft 23 to be pivoted in order to influence the direction in which the transport robot 1 travels. Autonomous driving of the transport robot 1 is thus for example possible. Alternatively or in addition, it is also possible for energy recovery devices for recovering kinetic energy to be integrated into the drive modules. This is expedient in particular when using an electric motor which, in the event of braking of the transport robot 1, can generate energy in the form of electrical current and conduct this to a battery module.

Figure 9:
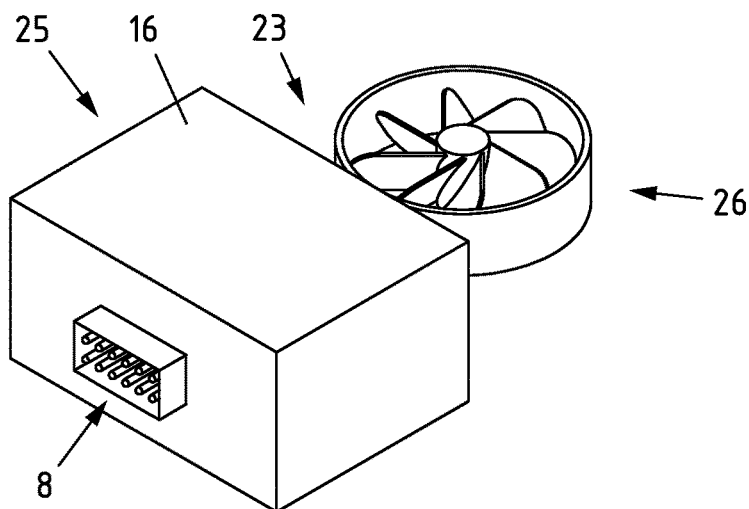
FIG. 9 shows a drive module for the flight of the transport robot from FIG. 1 in a perspective view.

FIG. 9 illustrates a further type of drive module 25 which serves not for driving but for flight of the transport robot 1. For this purpose, the drive module 25 has a drive unit and, as required, a gearing in order to drive a drive output shaft 23 on which a rotor 26 is mounted. Lift is generated in a known manner as a result of the rotation of the rotor 26. In this case, too, as in the case of driving, a single such drive module 25 will generally not suffice to lift the transport robot 1 off the ground, such that, in the illustrated and thus preferred transport robot 1, the corresponding drive modules 22, 25 are assigned in each case to the four edges distributed over the circumference of the transport robot 1. Furthermore, as in the case of the illustrated transport robot 1, different drive modules 25 may be combined. The illustrated and thus preferred transport robot 1 can consequently both fly and drive.

Figure 10:
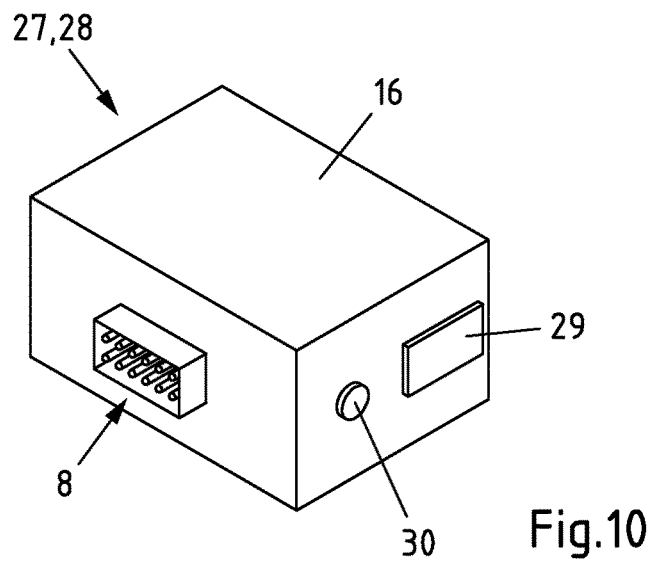
FIG. 10 shows a lighting module and/or sensor module of the transport robot from FIG. 1 in a perspective view.

FIG. 10 illustrates an expansion module in the form of a lighting module 27 and/or a sensor module 28. If it appears to be expedient, it is also possible for two different functional devices such as sensors 29 and illuminants 30 to be combined in a single expansion module. To be able to provide greater flexibility, however, a separation into individual expansion modules is expedient. Furthermore, in this way, it is more easily possible for different types of sensors 29 or sensor modules 28 to be combined with different types of lighting means 27 or illuminants 30.

The sensor module 28 may for example serve for detecting the location of the transport robot 1 or possible obstructions. For this purpose, a sensor 29 in the form of a receiver unit for receiving information data or satellite data, for example GPS (Global Positioning System) data, may be provided. Use may however also be made of a sensor 29 in the form of a distance sensor, for example using a laser, ultrasound or optical signals. It is also possible for sensors 29 in the form of optical devices for detecting and identifying particular objects to be provided, for example in order to be able to identify where consignments are to be delivered or picked up.

Figure 11:
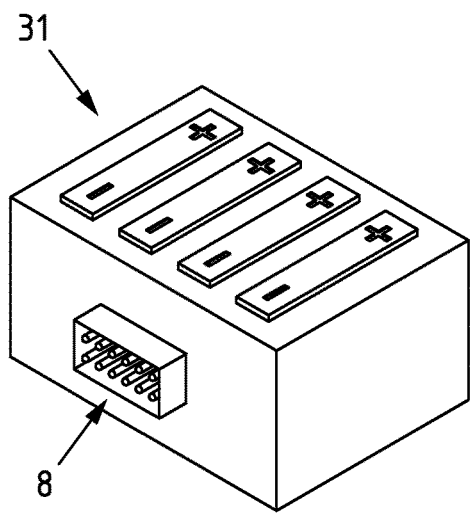
FIG. 11 shows a battery module of the transport robot from FIG. 1 in a perspective view.

The lighting module 27 may have illuminants 30 which permit marking of the transport robot 1 such that it can be more easily seen by pedestrians or other vehicles. It is however alternatively or additionally also possible for illuminants 30 to be provided for generating light signals. Accordingly, a transport robot 1 can for example display a flashing light when it is traveling in public road traffic. This is expedient in particular if the transport robot 1 is on the move at least at dawn or dusk. To be able to satisfy the requirements with regard to lighting, it is possible for different types of lighting modules 27 to be provided, which have different illuminants 30. The illuminants 30 may however alternatively or additionally also serve for lighting the surroundings of the transport robot 1, in particular if the transport robot 1 orients itself at least partially by optical means. In this case, too, depending on the required nature and/or intensity of the lighting, it is possible between different types of FIG. 11 illustrates an expansion module in the form of a battery module 31 which serves for supplying energy to the transport robot 1. Depending on the energy demand and the duration of autonomous operation of the transport robot 1, it is possible, as required, for different types of battery modules 31 to be selected from the transport robot system. Alternatively or in addition, it is also possible for the number of battery modules 31 used for a transport robot 1 to be selected in accordance with particular specifications. Here, in the present case, batteries are to be understood not only to mean batteries in the classic sense but also accumulators which must be not exchanged but rather merely recharged.

Figure 12:
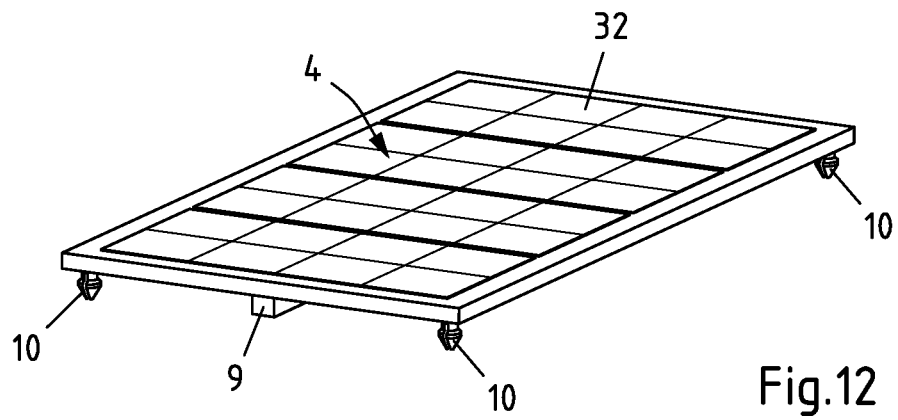
FIG. 12 shows a solar panel of the transport robot from FIG. 1 in a perspective view.

The battery modules 31 of a transport robot 1 may, as required, also be recharged during the operation of the transport robot 1 if the transport robot 1 has for example a solar module 32 and/or a solar panel 4, as illustrated in FIG. 12. The solar panel 4 may be connected to a solar module 32, to a control device 13 and/or to a battery module 31, such that the electrical current from the solar panel 4 is stored in the battery module 31 and/or the solar module 32. The solar modules 32 and solar panels 4 of the transport robot system may be of a variety of types, and may be selected in particular in a manner dependent on the intensity of the expected solar irradiation and/or the magnitude of the expected energy demand. For example, it is also possible for multiple solar modules 32 and/or solar panels 4 to be combined in one transport robot 1.

Alternatively or in addition to the solar module 32, it would also be possible for at least one electromotive brake to be provided, in the case of which the braking energy is recovered, for example by means of an eddy-current brake or the like, and stored in a battery, in particular in the battery module 31. During the braking of the transport robot 1, the energy is then not fully dissipated but rather recovered to a great extent as electrical energy.

Figure 13:
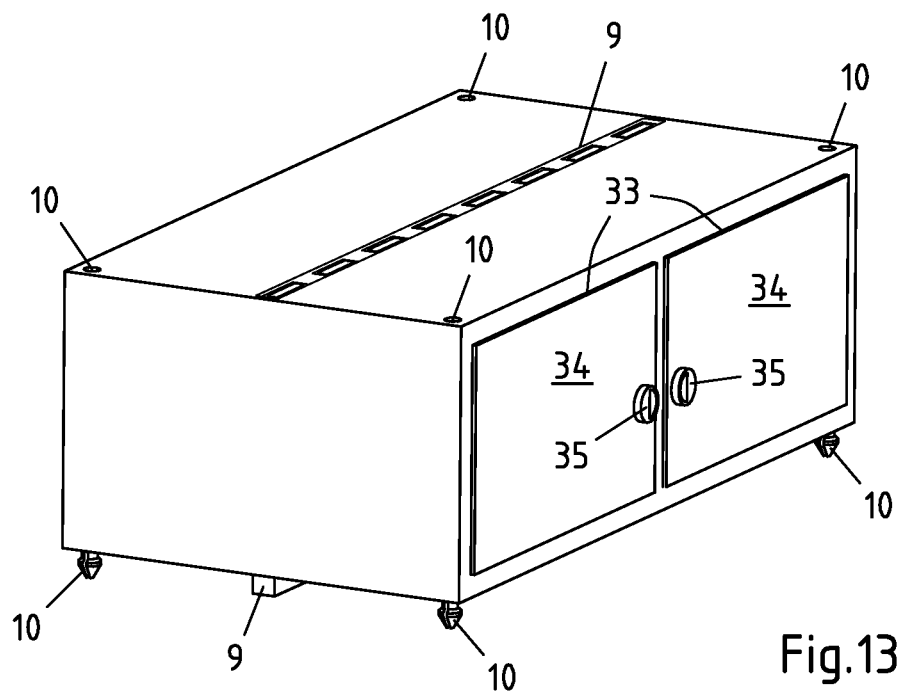
FIG. 13 shows a consignment box of the transport robot from FIG. 1 in a perspective view.

FIG. 13 illustrates, by way of example, a consignment box 3. Various types of consignment boxes 3 may be provided in the transport robot system 1 in order for these to be able to be selected in accordance with the number, type and/or size of consignments that are to be transported. The consignments may very basically be piece goods of all types. The illustrated and thus preferred transport robot 1 is provided in particular for transporting consignments in the form of package consignments. In the case of the consignment box 3, for inserting the consignments, two openings 33 are provided, which can each be closed by means of a flap 34. Furthermore, each flap 34 is also assigned a locking means 35 in order to be able to lock the flap 34 in the closed position. The locking means 35 can be mechanically operated by an operator or electronically operated by the transport robot 1 in order to cause or prevent an opening. In the latter case, the locking means 35 are preferably connected to a control device 13 in order to control the opening and closing of the flap or enable these only under certain conditions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A modular transport robot for transporting consignments, comprising:
   at least one base element for the physical structure of the transport robot;
   at least two expansion modules for the technical equipping of the transport robot;
   at least one consignment box for receiving consignments; and
   at least one control device for controlling the transport robot;
   wherein the at least one base element and each of the expansion modules have corresponding connecting elements and are in each case electrically connected to one another by means of at least one electrical connection comprising the corresponding connecting elements;
   wherein the at least one base element has at least one wiring harness for electrically connecting the connecting elements of the base element to one another;
   wherein the at least one base element and the expansion modules are designed correspondingly to one another such that the connecting elements of the at least two expansion modules are in each case selectively connectable directly to at least two connecting elements provided at different points, so as to form in each case one common connection to the at least one base element; and
   further comprising at least one communication device for communication between the transport robot and an external control station;
   wherein the at least one base element has a multiplicity of mutually spaced-apart receptacles for receiving expansion modules, in particular in positively locking fashion, and wherein the at least two expansion modules are received, in particular in positively locking fashion, in different receptacles; and
   wherein the receptacles are bounded on at least four sides and have an opening for inserting the expansion modules in a substantially horizontal direction, and wherein at least one connecting element is provided at those sides of the receptacles which are averted from the openings.

2. The modular transport robot according to claim 1, wherein the connecting elements are designed at least substantially as plug-type connecting elements and/or wherein the electrical connection is designed at least substantially as an electrical plug-type connection.

3. The modular transport robot according to claim 1, wherein at least one drive device for moving the transport robot to a picking-up location and/or delivery location for the consignments, and/or at least one signal router for transmitting signals, in particular at least a particular type of signals, between expansion modules are provided.

4. The modular transport robot according to claim 3, wherein the at least one control device is provided in an expansion module in the form of a control module, the at least one communication device is provided in an expansion module in the form of a communication module, and/or the at least one drive device is provided in an expansion module in the form of a drive module.

5. The modular transport robot according to claim 1, wherein at least one expansion module is received simultaneously in two adjacent receptacles of the at least one base element.

6. The modular transport robot according to claim 5, wherein the at least one expansion module is connected to in each case one connecting element assigned to each receptacle, so as to form a connection, and/or a wall which separates the two adjacent receptacles is at least partially received in a recess of the expansion module.

7. The modular transport robot according to claim 1, wherein the at least one base element is, aside from the connection, additionally mechanically connected to the at least two expansion modules.

8. The modular transport robot according to claim 7, wherein the at least one base element is mechanically connected to the at least two expansion modules in each case by means of at least one detent connection and wherein the mechanical connections are provided at those sides of the receptacles which are averted from the openings.

9. The modular transport robot according to claim 1, wherein at least one expansion module is designed as a consignment box for transporting consignments, as a drive module for moving the transport robot to a picking-up location and/or delivery location for the consignments, as an axle module for the mounting of a wheel, as a communication module for communication between the transport robot and an external control station or another transport robot, as a control module for controlling the transport robot, as a battery module for the voltage supply of the transport robot, as a lighting module for the lighting of the transport robot and/or of the surroundings of the transport robot, as a sensor module for detecting the surroundings of the transport robot, and/or as a solar module for supplying the transport robot with electrical current obtained by means of at least one solar panel.

10. The modular transport robot according to claim 1, wherein the at least one wiring harness has lines for the supply of voltage to at least one expansion module, lines for transmitting control commands and/or pieces of information between expansion modules and/or between at least one expansion module and the at least one control device and/or communication device.

11. The modular transport robot according to claim 1, wherein at least two, in particular identical, base elements are provided with corresponding base connecting elements, in particular base plug-type connecting elements.

12. The modular transport robot according to claim 11, wherein the at least two base elements are, aside from a base connection, in particular base plug-type connection, additionally mechanically connected to one another.

13. The modular transport robot according to claim 12, wherein the mechanical connections are provided at those edges of the base elements which face toward one another.

14. The modular transport robot according to claim 11, wherein the at least two base elements, one above the other, are connected to one another by means of a base plug-type connection formed by means of the corresponding base connecting elements.

15. The modular transport robot according to claim 1, wherein the at least one consignment box has at least one base connecting element, in particular base plug-type connecting element, for connecting to a base element and/or to a further consignment box.

16. The modular transport robot according to claim 15, wherein the at least one consignment box has, on a top side and/or on a bottom side, base connecting elements which correspond to one another and/or to the base connecting elements of at least one base element.

17. The modular transport robot according to claim 1, wherein at least one solar panel has at least one base connecting element, in particular base plug-type connecting element, for connecting to a base element and/or to a further consignment box.

18. The modular transport robot according to claim 17, wherein the at least one base element, the at least one consignment box and/or the at least one solar panel are arranged in multiple planes one above the other.

19. The modular transport robot according to claim 18, wherein the at least one base element, the at least one consignment box and the at least one solar panel are connected to one another directly, in particular by means of a detent connection.

20. The modular transport robot according to claim 17, wherein the base connecting element of the at least one solar panel is designed so as to correspond with at least one base connecting element of at least one base element and/or of a consignment box.

21. The modular transport robot according to claim 1, wherein at least one electromotive brake, in particular comprising an eddy-current brake, for converting braking energy into electrical energy is provided.

22. The modular transport robot according to claim 21, wherein the electromotive brake is connected, for the storage of the recovered electrical energy, to a battery and/or to a battery module.

23. The modular transport robot according to claim 1, wherein the at least one consignment box has at least one opening for inserting and removing at least one consignment.

24. The modular transport robot according to claim 23, wherein the at least one opening is closable by means of a flap and/or door and wherein a locking means, in particular lock for locking the flap and/or door in a position which closes the opening is provided.

25. A transport robot system for the modular assembly of modular transport robots, for transporting consignments, comprising:
    base elements for the physical structure of the transport robots; various expansion modules for the technical equipping of the transport robot; and
    control devices for controlling the transport robots; wherein the base elements and the expansion modules have corresponding connecting elements for electrically connecting the base elements in each case to a multiplicity of expansion modules;
    wherein the base elements each have at least one wiring harness for electrically connecting the connecting elements of the base element to one another;
    wherein the base elements and the expansion modules are designed correspondingly to one another such that, selectively at one point of the base elements, identical and/or different expansion modules are electrically connectable to the base elements by means of base connections, in particular base plug-type connections, and/or such that identical and/or different expansion modules at different points of the base elements selectively are electrically connectable to the base elements by means of connections; and
    further comprising communication devices for communication between transport robots and external control stations;
    wherein at least one base element has a multiplicity of mutually spaced-apart receptacles for receiving expansion modules, in particular in positively locking fashion, and wherein the at least two expansion modules are received, in particular in positively locking fashion, in different receptacles; and wherein the receptacles are bounded on at least four sides and have an opening for inserting the expansion modules in a substantially horizontal direction and wherein at least one connecting element is provided at those sides of the receptacles which are averted from the openings.

26. The transport robot system according to claim 25, wherein drive devices for moving the transport robots to a picking-up location and/or delivery location for the consignments, and/or signal routers for transmitting signals, in particular at least a particular type of signals, between expansion modules are provided.

27. The transport robot system according to claim 26, wherein the control devices are provided in expansion modules in the form of control modules, the communication devices are provided in expansion modules in the form of communication modules, and/or the drive devices are provided in expansion modules in the form of drive modules, and/or wherein expansion modules are designed as identical and/or different consignment boxes for transporting consignments, as identical and/or different drive modules for moving the transport robot to a picking-up location and/or delivery location for the consignments, as identical and/or different axle modules for the mounting of a wheel, as identical and/or different communication modules for communication between the transport robot and an external control station or another transport robot, as identical and/or different control modules for controlling the transport robot, as battery modules for the voltage supply of the transport robot, as identical and/or different lighting modules for the lighting of the transport robot and/or of the surroundings of the transport robots, as identical and/or different sensor modules for detecting the surroundings of the transport robot, and/or as identical and/or different solar modules for supplying the transport robots with electrical current obtained by means of at least one solar panel.

28. The transport robot system according to claim 25, wherein expansion modules which can be received simultaneously in two adjacent receptacles of the base elements are provided.

29. The transport robot system according to claim 28, wherein the base elements are, in addition to an electrical connection, mechanically connectable to expansion modules.

30. The transport robot system according to claim 25, wherein the wiring harnesses of the identical and/or different base elements have lines for the supply of voltage to at least one expansion module, lines for transmitting control commands and/or pieces of information between expansion modules and/or between at least one expansion module and the at least one control device and/or communication device.

31. The transport robot system according to claim 25, wherein the identical and/or different base elements are each provided with corresponding base connecting elements, in particular base plug-type connecting elements.

32. The transport robot system according to claim 25, wherein the identical and/or different base elements are, in addition to the base connections, in particular base plug-type connections, mechanically connectable to one another.

33. The transport robot system according to claim 25, wherein identical and/or different consignment boxes are provided.

34. The transport robot system according to claim 25, wherein identical and/or different solar modules and/or solar panels are provided.

35. The transport robot system according to claim 34, wherein the base elements, the consignment boxes, solar modules and/or the solar panels are arrangeable in multiple planes one above the other.

36. The transport robot system according to claim 25, wherein the at least one consignment box has at least one opening for inserting and removing at least one consignment.

37. A transport robot system for the modular assembly of modular transport robots, for transporting consignments, comprising:

base elements for the physical structure of the transport robots; various expansion modules for the technical equipping of the transport robot; and control devices for controlling the transport robots; wherein the base elements and the expansion modules have corresponding connecting elements for electrically connecting the base elements in each case to a multiplicity of expansion modules;

wherein the base elements each have at least one wiring harness for electrically connecting the connecting elements of the base element to one another;

wherein the base elements and the expansion modules are designed correspondingly to one another such that, selectively at one point of the base elements, identical and/or different expansion modules are electrically connectable to the base elements by means of base connections, in particular base plug-type connections, and/or such that identical and/or different expansion modules at different points of the base elements selectively are electrically connectable to the base elements by means of connections; and further comprising communication devices for communication between transport robots and external control stations;

wherein the base elements each have a multiplicity of mutually spaced-apart receptacles for receiving identical and/or different expansion modules, in particular in positively locking fashion, and/or wherein at least two identical and/or different expansion modules can be received, in particular in positively locking fashion, in different receptacles, and/or wherein the receptacles of the base elements each have an opening for inserting the expansion modules and have at least one connecting element at those sides of the receptacles which are averted from the openings.

\* \* \* \* \*